March 24, 1936.　　　E. W. MILLER　　　2,034,765
GEAR SHAPING MACHINE
Filed Aug. 6, 1932　　　9 Sheets-Sheet 1
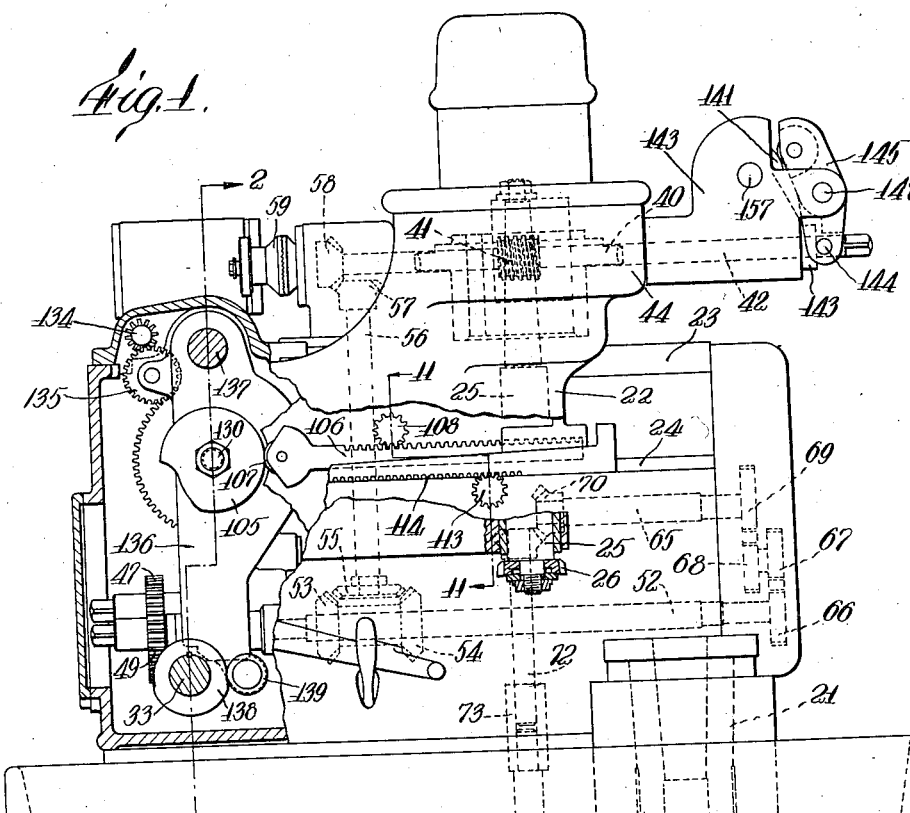
Fig. 1.
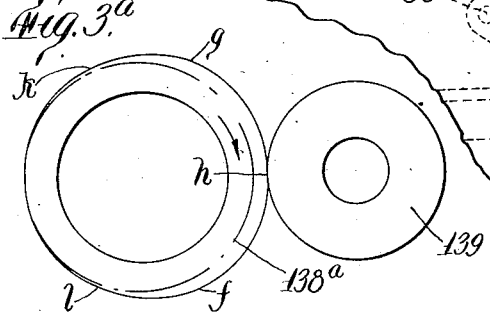
Fig. 3ª.
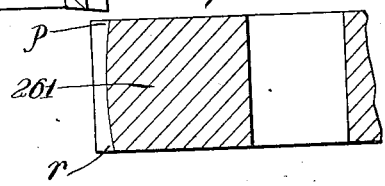
Fig. 3ᵇ.
Inventor
Edward W. Miller
by Wright, Brown, Quinby & May
Attys.

March 24, 1936. E. W. MILLER 2,034,765
GEAR SHAPING MACHINE
Filed Aug. 6, 1932   9 Sheets-Sheet 2

Inventor
Edward W. Miller
by Wright, Brown, Quinby & May
Attys.

March 24, 1936. E. W. MILLER 2,034,765
GEAR SHAPING MACHINE
Filed Aug. 6, 1932 9 Sheets-Sheet 3
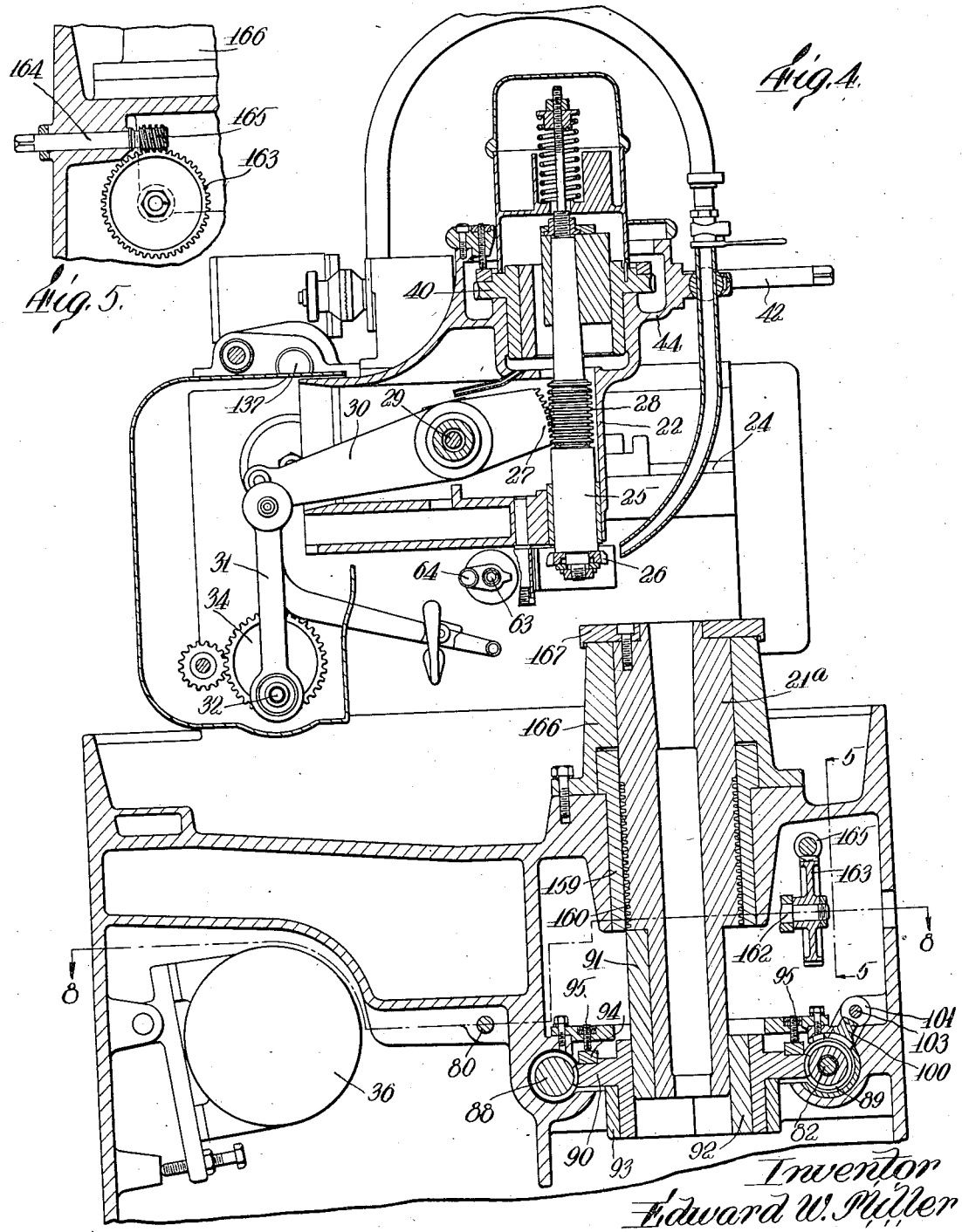

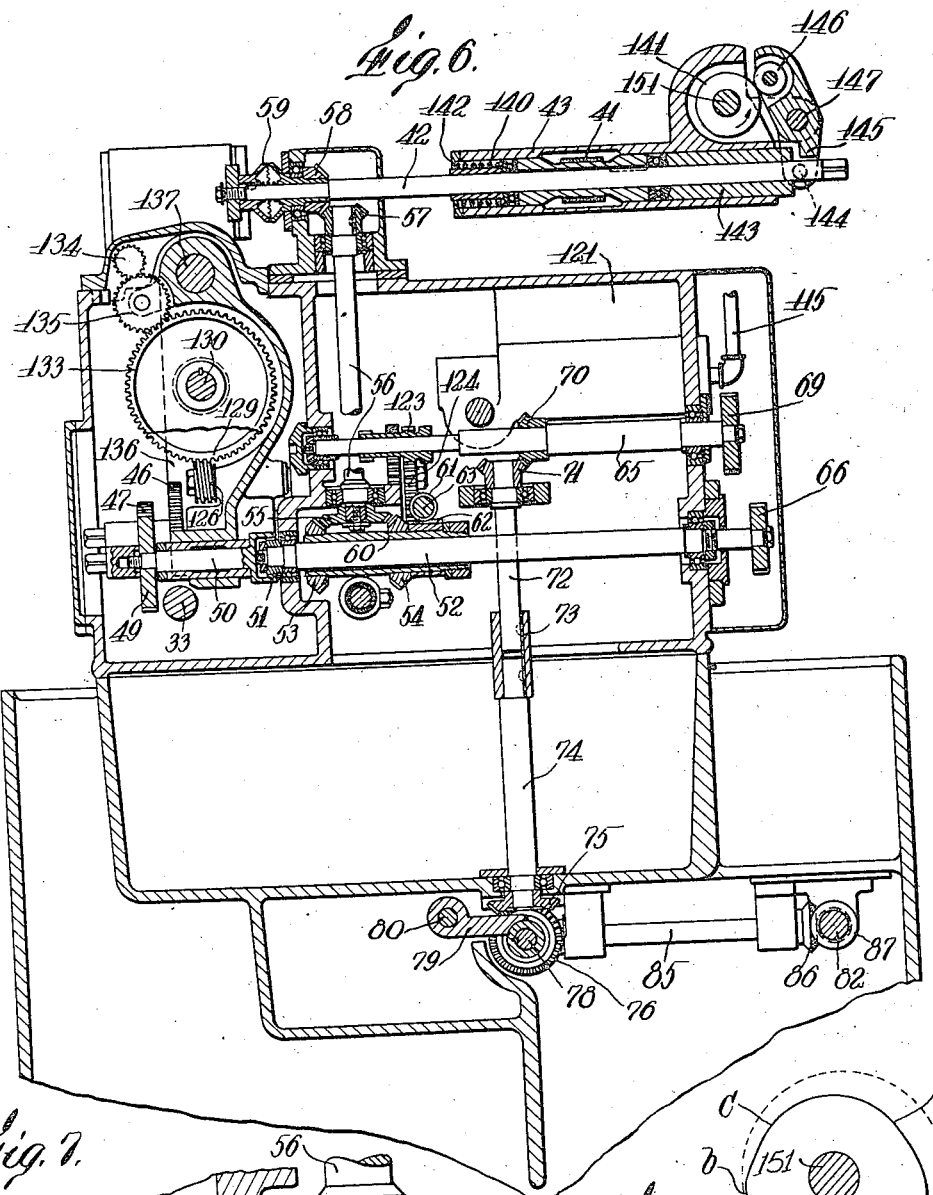

March 24, 1936.  E. W. MILLER  2,034,765
GEAR SHAPING MACHINE
Filed Aug. 6, 1932  9 Sheets-Sheet 6

Inventor
Edward W. Miller
by Wright, Brown, Quinby Thay
Attys.

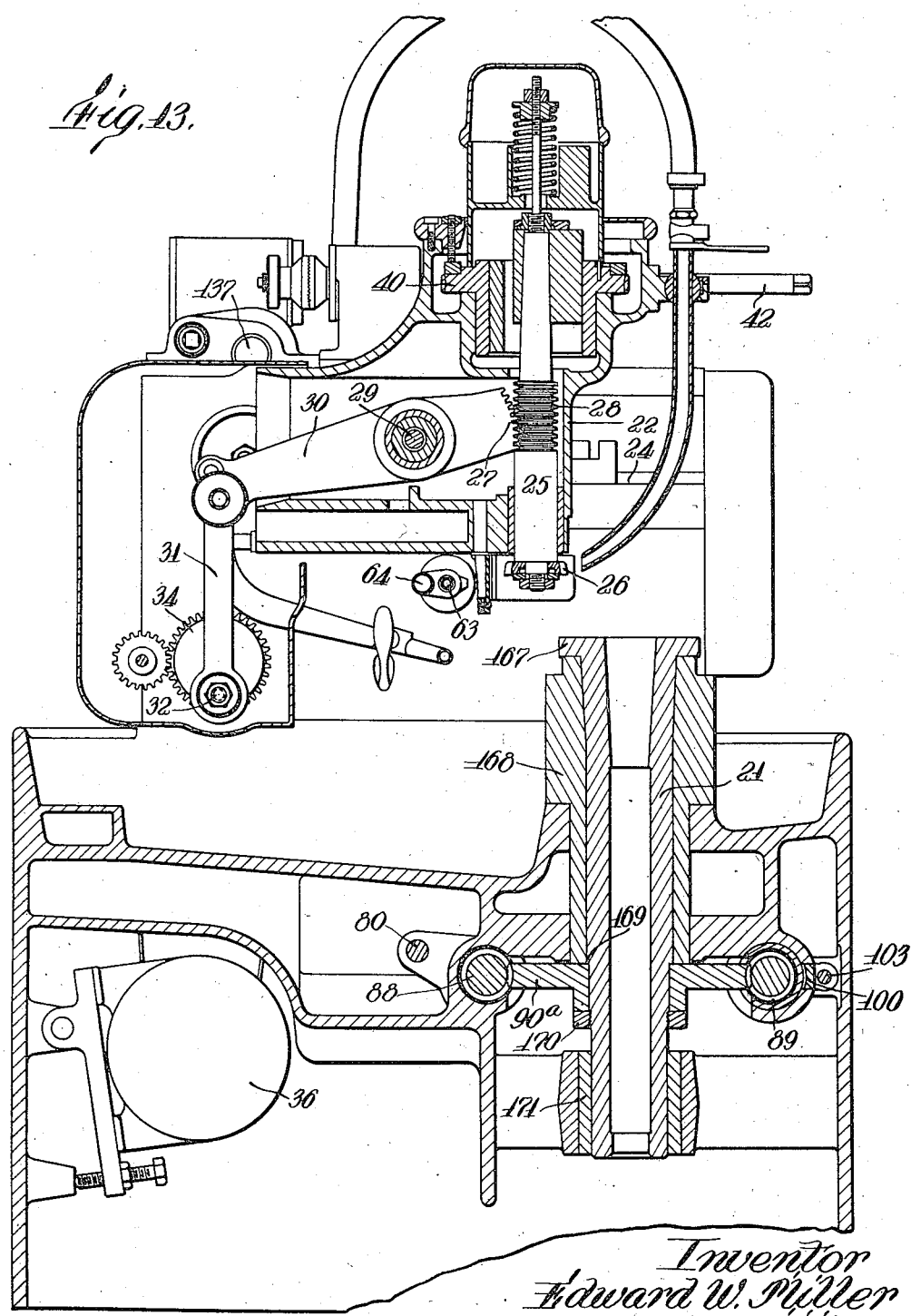

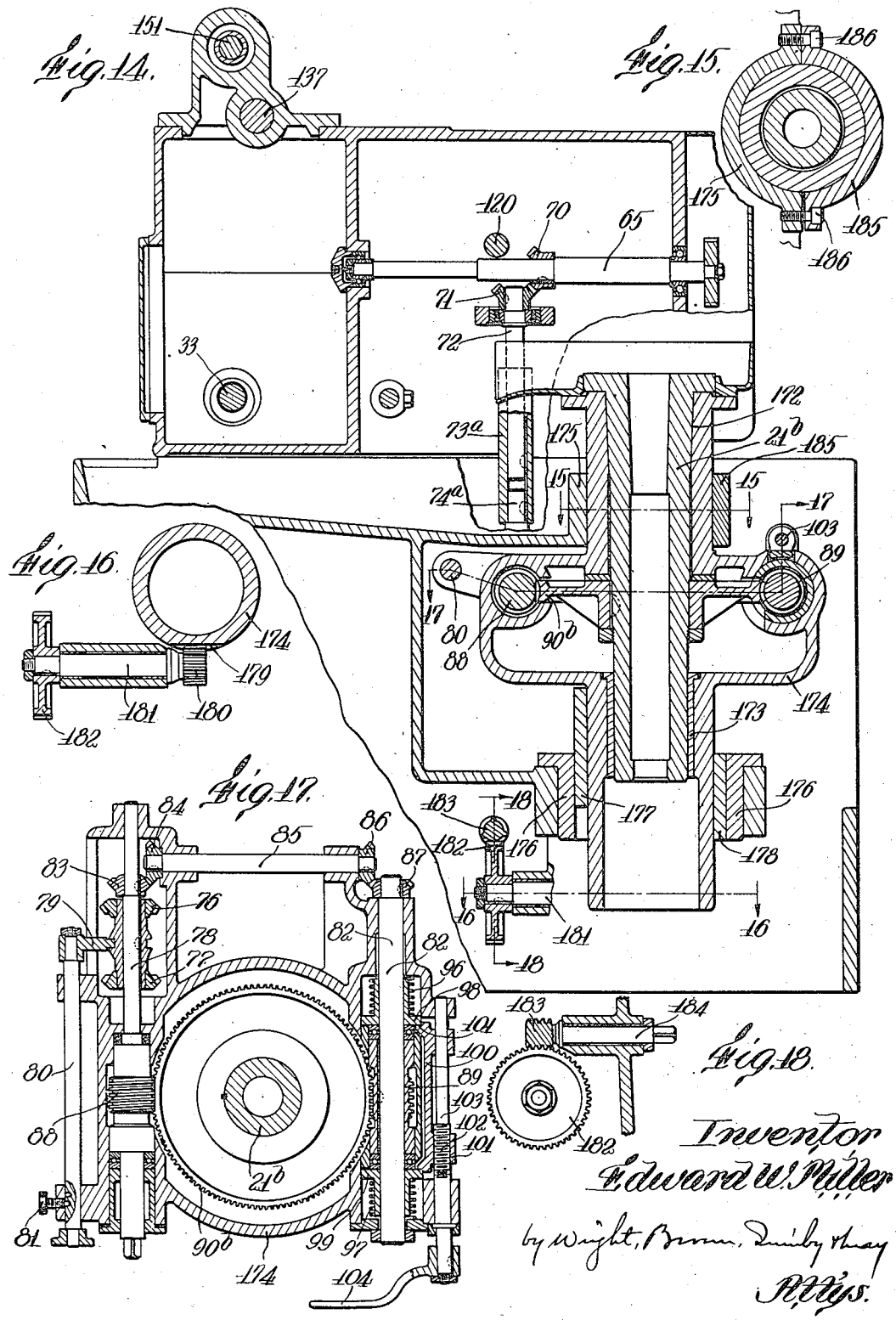

March 24, 1936.  E. W. MILLER  2,034,765
GEAR SHAPING MACHINE
Filed Aug. 6, 1932   9 Sheets-Sheet 9

Inventor
Edward W. Miller
by Wright, Brown, Quinby & May
Attys.

Patented Mar. 24, 1936

2,034,765

UNITED STATES PATENT OFFICE 2,034,765

GEAR SHAPING MACHINE

Edward W. Miller, Springfield, Vt., assignor to The Fellows Gear Shaper Company, Springfield, Vt., a corporation of Vermont Application August 6, 1932, Serial No. 627,730

45 Claims. (Cl. 90—9)

This invention relates to gear shaping machines of the type in which a cutter having teeth arranged correspondingly to those of a gear element, with cutting edges at one end, is given a movement of reciprocation relatively to the work piece, or vice versa, while relative rotational movements of generation are imparted to the cutter and work, similar to those of gears running together in mesh, in such manner that teeth are generated and cut in the work with forms conjugate to the tooth forms or outlines of the cutter.

The main objects of the invention are to provide an improved mode of backing off the cutter from the work during noncutting, or return, strokes so as to avoid all rubbing interference at such times; to afford means for adjusting or locating the work spindle as to its height, i. e., its position relatively to the range of reciprocating travel of the cutter; to provide an improved means for applying generative rotation to the work spindle so as to maintain the work more accurately in position, avoiding backlash and looseness; to improve, simplify and reduce the cost of manufacture of the guides for the cutter spindle, particularly those used when the machine is designed to cut helical gears; and to provide in connection with the driving means for the spindle a compensating device adapted to give an increment of helical movement to the cutter additional to that given by the above mentioned guiding means when cutting helical gears, or for correcting an anticipated twist, due to heat treatment, in any gears whether helical or straight spur gears. The utility and value of the foregoing objects are explained in the following detailed description of the machine which I have chosen for illustration herein of the invention.

The illustrative machine referred to is one of the type shown in the patents of Edwin R. Fellows, No. 1,478,472, dated December 25, 1923, and No. 1,463,806, dated August 7, 1923, although the protection which I claim herein is not limited exclusively to combination or use with machines of that species.

In the illustrative drawings furnished herewith,—

Fig. 1 is a front elevation, partly broken away and sectioned to show interior parts, of the illustrative machine above referred to;

Fig. 3a (sheet 1) is an elevation of a modified cam;

Fig. 3b is a diagram showing the effect of such cam;

Fig. 4 is a vertical section of the machine taken on line 4—4 of Fig. 2, showing a variation in the work spindle from the form illustrated by dotted lines in Fig. 1;

Fig. 5 is a fragmentary sectional view on line 5—5 of Fig. 4;

Fig. 6 is a vertical section taken on line 6—6 of Fig. 2;

Fig. 6a is an elevation of a modified form of cam for oscillating the cutter;

Fig. 7 is a fragmentary enlarged view of part of the mechanism shown in Fig. 6;

Fig. 13 is a view similar to Fig. 4 showing the form of work spindle indicated by broken lines in Fig. 1;

Fig. 14 is a vertical section showing another alternative form of work spindle and adjusting means, together with a section of the upper part of the machine taken on a plane in approximately the location of the line 14—14 of Figs. 2 and 8;

Figure 20:
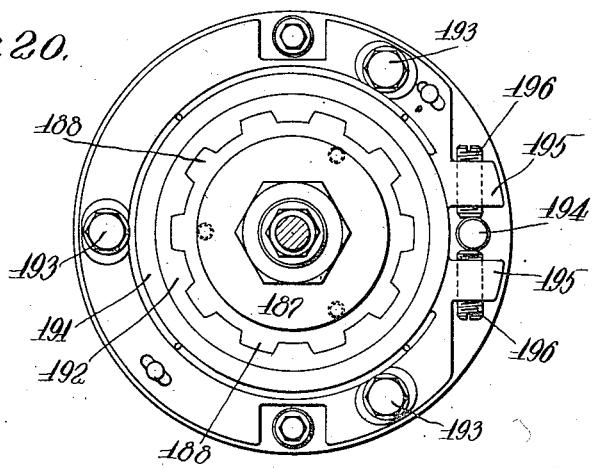
Figure 19:
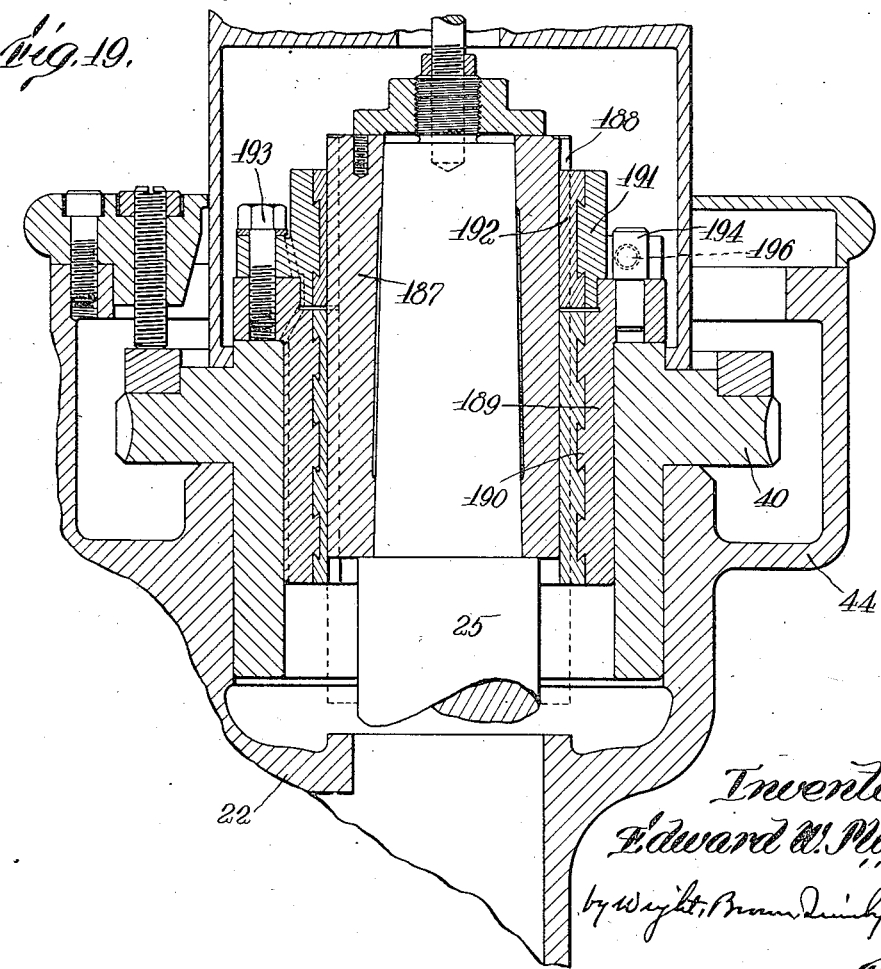

Figs. 15, 16 and 17 are horizontal sections taken on lines 15—15, 16—16 and 17—17, respectively, of Fig. 14;

Fig. 18 is a vertical detail section taken on line 18—18 of Fig. 14;

Fig. 19 is a vertical sectional view of the upper end of the cutter spindle, and adjacent parts, showing the details of my new improvement in guiding means for the spindle;

Fig. 20 is a plan view of the spindle end and guiding means.

Like reference characters designate the same parts wherever they occur in all the figures.

Figure 2:
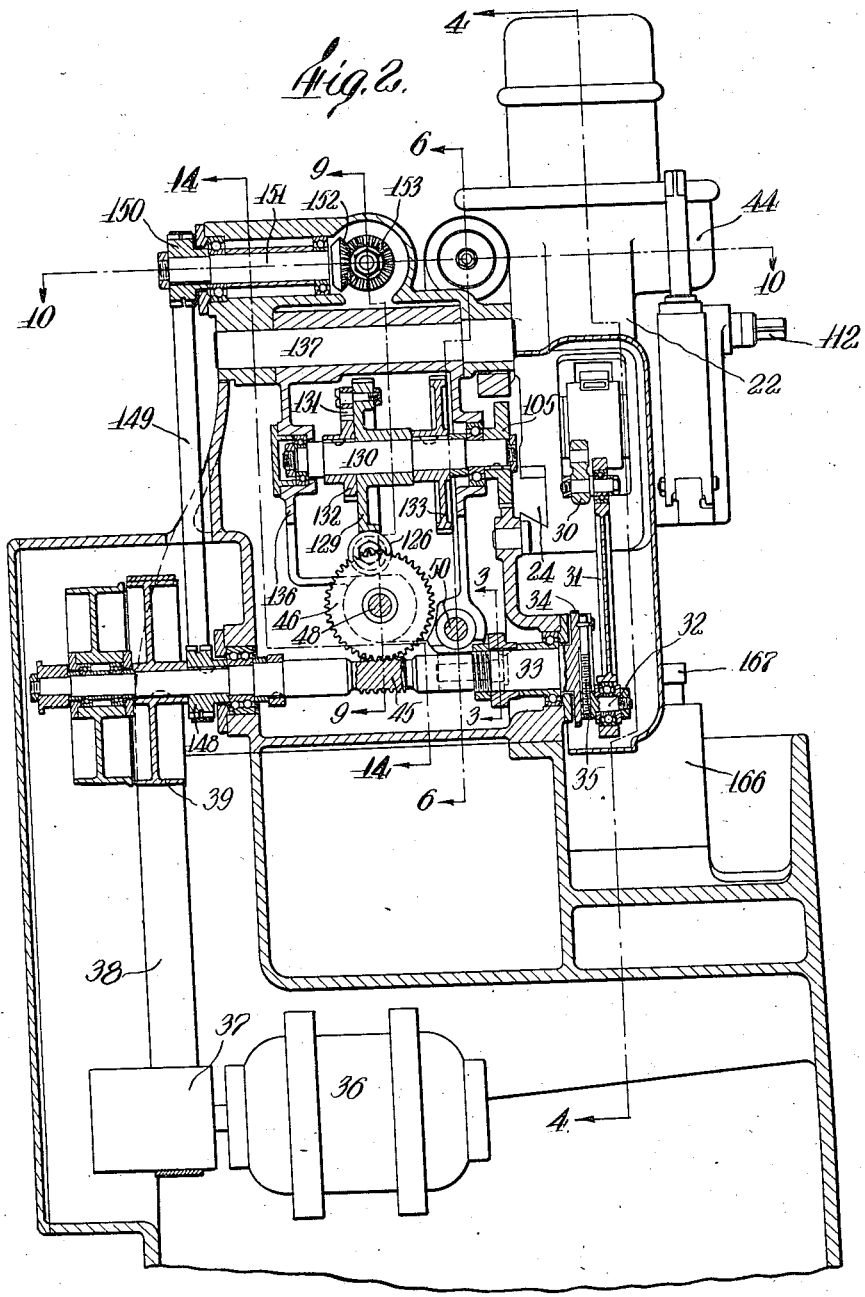
Fig. 2 is a vertical section taken on line 2—2 of Fig. 1.

A frame of any suitable character and construction, the details of which are immaterial to the present invention, supports a work spindle 21 (Figs. 1 and 13), or alternatively 21a (Fig. 4) or 21b (Fig. 14), and a cutter carriage or saddle 22 which is movable horizontally on guideways 23 and 24 toward and away from the axis of the work spindle. The saddle contains a rotatable and reciprocative cutter spindle 25, to the protruding lower end of which is secured a gear shaped planing cutter 26. Reciprocation is imparted to this spindle by means of a gear segment 27 (Fig. 4) meshing with encircling rack teeth 28 on the spindle, which segment is pivoted on an axis 29 and is oscillated by an arm 30 and connecting rod 31 from a crank pin 32 on a main shaft 33 (Fig. 2). The crank pin is adjustable in a radial slot in a disk 34 on said shaft, by means of a screw 35, in a known manner, whereby to determine the length of stroke of the cutter. The shaft is driven by any suitable motive power, here shown as an electric motor 36 operating through a pulley 37, belt 38 and pulley 39.

Figure 9:
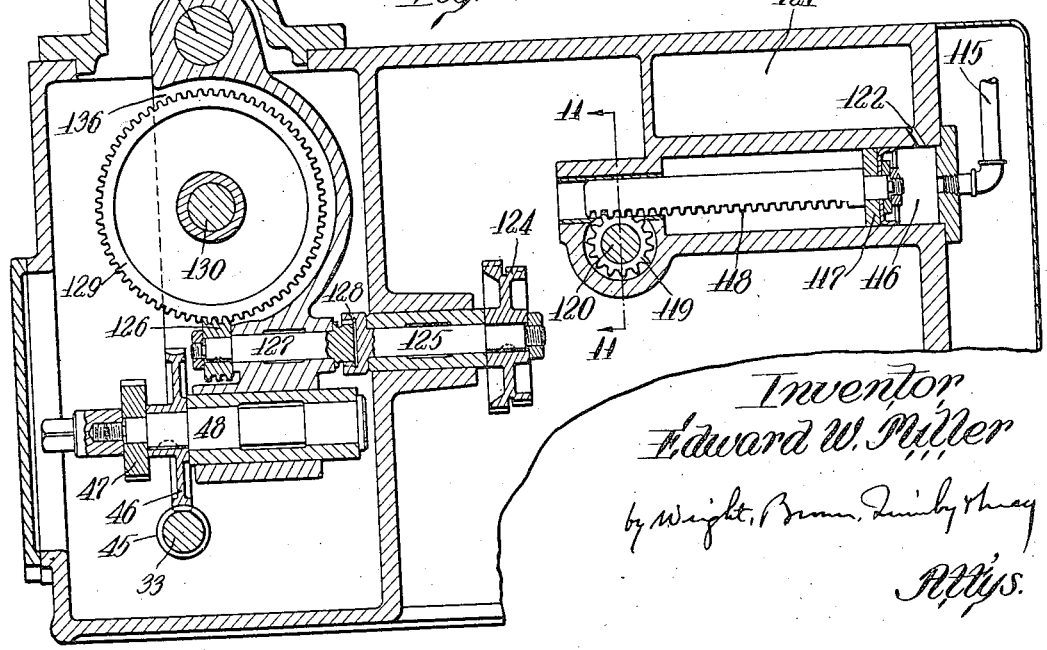
Fig. 9 is a vertical section taken on line 9—9 of Fig. 2.

Generative rotation is imparted to the cutter spindle by means of a worm wheel 40, called for convenience an index wheel, with which the spindle has splined engagement through guides later described, which index wheel is rotated by a worm 41 splined on a shaft 42 and having capacity for endwise movement in a housing 43 which is secured to a part 44 of the cutter saddle which provides the housing for the index wheel. Rotation is transmitted to shaft 42 from the main shaft 33 by a worm 45 (Figs. 2 and 9), worm wheel 46 and a gear 47 on shaft 48, intermeshing gear wheel 49 on a shaft 50 (Fig. 6), clutch 51, shaft 52, one or the other of two bevel gears 53 and 54, bevel gear 55 on a shaft 56, and bevel gears 57 and 58, the latter being loose on shaft 42 and coupled thereto by a clutch 59.

The bevel gears 53 and 54 are made fast to a sleeve 60, one at either side of gear 55, which sleeve is splined to shaft 52 and is shiftable endwise so as to bring either gear 53 or 54 into mesh, and the other simultaneously out of mesh, with gear 55, whereby to drive the index worm wheel 40 in either direction. A shifter for the gear carrying sleeve 60 is provided in the form of a pinion 61 (Fig. 6) meshing with a rack 62, in which the sleeve has a rotative bearing; said pinion being secured to a shaft 63 having an operating crank 64 at the front of the machine (Fig. 4).

Figure 8:
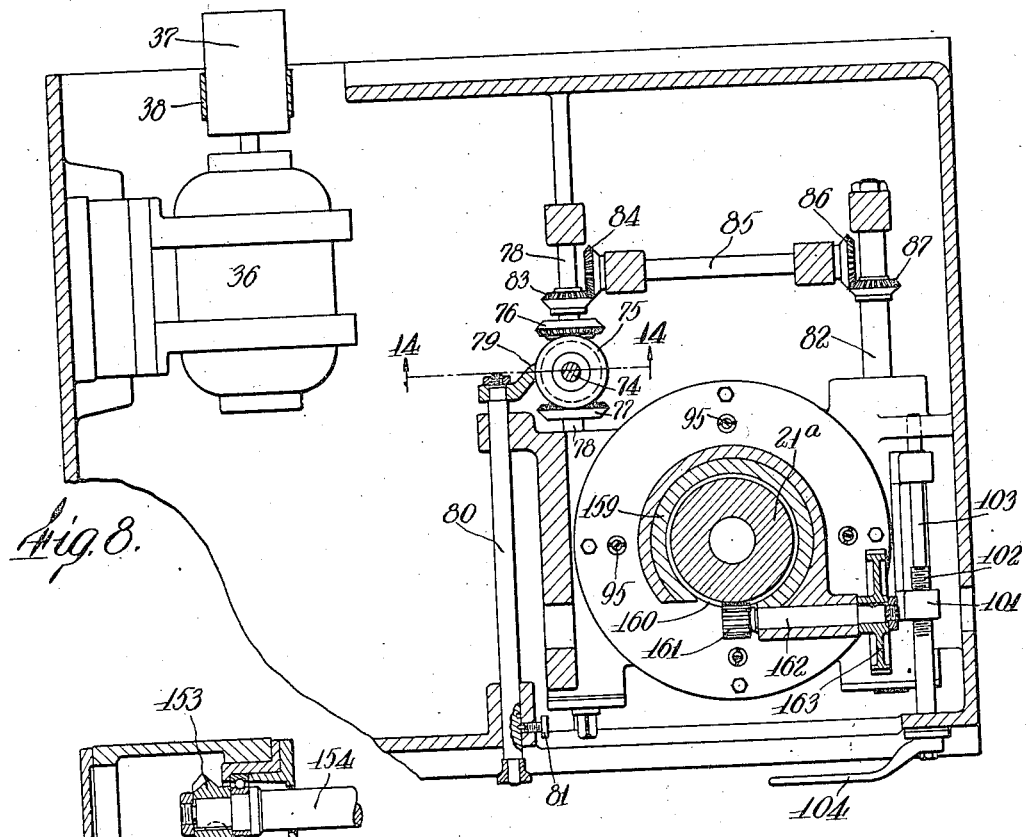
Fig. 8 is a horizontal section taken on line 8—8 of Fig. 4.

The work piece to be cut is secured to an arbor, not shown, mounted detachably in a socket in the spindle 21 (or correspondingly 21a or 21b), in a manner well understood in this art and therefore not requiring illustration herein. It is rotated in harmony with the rotation of the cutter (so that the pitch line velocities of the cutter and work piece will be equal, and take place in the same direction at the tangent point) by mechanism which will now be described in connection with the form of spindle shown in Fig. 4. Shaft 52 drives a shaft 65 through a changeable gear train 66, 67, 68 and 69 (Figs. 1 and 6) of well known character, and the shaft 65 carries a bevel gear 70 meshing with a bevel gear 71 on a vertical shaft 72 which is connected by a coupling sleeve 73 with an alined shaft 74 carrying a bevel gear 75. The last named bevel gear is located between two opposed bevel gears 76 and 77 slidably mounted on a shaft 78 (Fig. 8) and adapted to be moved by a shifter 79 and shifter rod 80 so that either of the opposed gears may be meshed with the gear 75 for driving shaft 78 in either direction. Rod 80 projects to the front of the machine where it is accessible for manipulation, and is locked in position to hold one or the other of the sliding gears 76 or 77 in mesh by a screw 81, as plainly shown in Fig. 8. A shaft 82 parallel to shaft 78 is driven in unison therewith but in the opposite direction by a bevel gear pair 83, 84, a transverse shaft 85, and a bevel gear pair 86, 87. Shafts 78 and 82 carry worms 88 and 89 respectively, (Fig. 4), at respectively opposite sides of, and both in mesh with, a worm wheel 90 which is coupled with the work spindle so as to transmit rotation thereto. Such coupling, in the case of spindle 21a, consists of semi-cylindrical sleeves 91 and 92 secured respectively to the spindle and the worm wheel, and having complemental longitudinal abutting edges in sliding contact with one another to permit endwise adjustment of the spindle.

The worm wheel 90 constitutes the so-called index wheel for the work spindle and work. It is supported independently of the spindle in a bearing 93 and is held against endwise movement by a thrust bearing ring 94 and adjusting screws 95.

The use of two worms for rotating this index wheel is a valuable feature of the present invention. The two worms take up all backlash, and both exert force tangentially of the wheel in the same direction toward one side of the bearing 93 to prevent looseness of the wheel in the bearing. One of the worms is under elastic tension exerted axially, to produce this pressure effect; and the direction of thrust of the tensioning means may be reversed in accordance with the direction in which the worms and wheel are rotated.

The worm 89 is the one thus tensioned. Its details and the details of its tension adjusting and reversing means are the same as those of the worms used with the alternative forms of spindle here illustrated, and are shown in Fig. 17, which illustrates the drive for the spindle 21b shown in Fig. 14. The worm is splined on shaft 82 for endwise sliding movement and is pressed upon oppositely at its opposite ends by springs 96 and 97, acting respectively through sliding sleeves 98 and 99 and reacting against stationary abutments in the shaft bearings. Ball thrust bearings may be interposed between these sleeves and the worm, as shown. A tension adjuster 100 has shoulders 101 overlapping the end flanges of said sleeves, and has also a nut 102 meshing with a threaded part on an adjusting shaft 103, which has an operating handle 104 at the front of the machine. By turning this handle in one direction or the other the sleeve 98 may be pushed back so as to relieve the worm from thrust of the spring 96 and allow spring 97 to exert unbalanced force, or vice versa.

Although I have described the two worms as being parallel to one another, and located on diametrically opposite sides of the worm wheel, it is obvious that this arrangement is not an essential, or limiting, factor of the invention. Quite evidently the worms may be at right angles to one another, or at any other angle provided they are so driven as to exert components of tangential force on the worm wheel in such directions as to combine in a resultant pressure of the worm wheel journals against their bearings, and to take up backlash. The machine designer, without further illustration, will appreciate how thus to arrange the worms at right angles, or other angles to each other, and to drive them by means and mechanisms of like principles to those described, with like effect.

Figure 11:
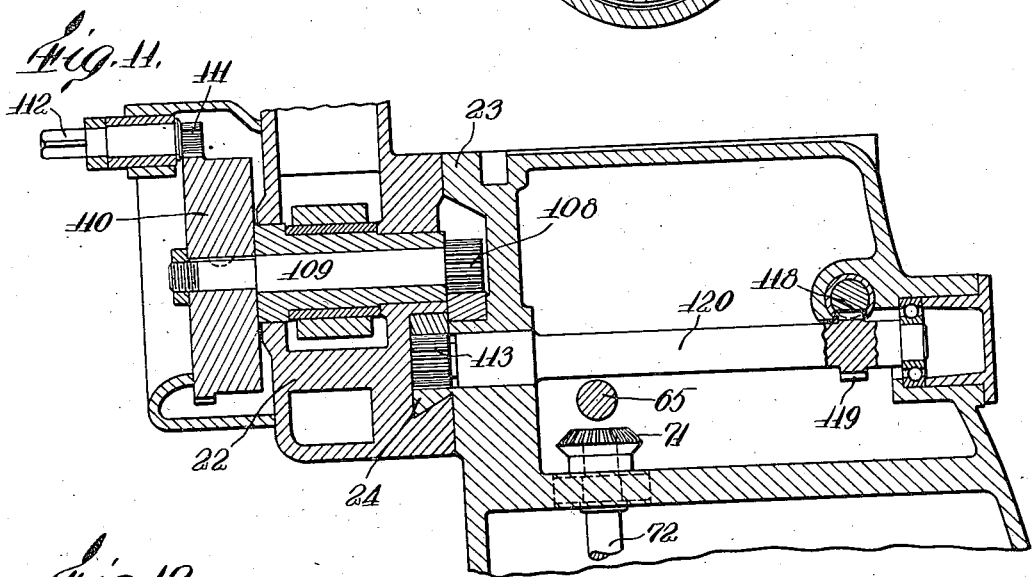
Fig. 11 is a fragmentary vertical section on an enlarged scale taken on line 11—11 of Figs. 1 and 9.

The cutter carriage or saddle is moved along its guides 23, 24 to withdraw the cutter when a gear blank is to be applied or a finished gear removed, to bring the cutter up to the work and feed it to proper depth, and for other purposes later explained; and when so moving, it carries the worm 41 with it, slidingly along the shaft 42. Such advancing and depth feeding movements are effected by a depth feed cam 105 (Fig. 1). The position of the carriage relative to the cam may be adjusted by a rack bar 106 carrying a cam abutment 107, slidable in the saddle and adjusted by a pinion 108, through the medium of shaft 109 (Fig. 11), gear 110, pinion 111, and shaft 112, substantially as shown in the Fellows Patents Nos. 1,463,806 and 1,478,472. As in said patents also, the saddle is yieldingly urged toward the cam, and withdrawn from the work spindle when the receding part of the cam permits, by means of a pinion 113 supported by the frame and meshing with a rack 114 fixed to the carriage. Unlike said patents, however, the yielding force which acts on the pinion 113, instead of being exerted by a weight, is caused by a fluid (pneumatic or hydraulic) under constant pressure transmitted from a pressure source, not shown, by a pipe 115 (Fig. 9) to a cylinder 116 containing a piston 117, the piston rod of which includes a rack 118 meshing with a pinion 119 on the same shaft 120 with pinion 113. A reservoir chamber 121 for the fluid is provided in the machine base and communicates with the cylinder by a port 122.

The depth feed cam is rotated by shaft 65 through a gear 123 on said shaft (Fig. 6), intermeshing gear 124 on shaft 125 (Fig. 9), a worm 126 on shaft 127 which is in alinement with shaft 125 and coupled thereto by a clutch 128, and a gear 129. This last named gear is rotatably mounted on shaft 130 (which carries the depth feed cam 105) and is coupled adjustably to said shaft by a pawl 131 carried by the gear and a ratchet wheel 132 (Fig. 2) keyed to the shaft. A gear 133, which is also shown as keyed to the shaft 130, is a means for turning the cam by hand independently of the automatic drive, and is actuated to that end by a gear train 134, 135, (Figs. 1 and 6), the first gear wheel of which is secured to a shaft extending to the front of the machine and there accessible for rotation by a wrench or crank, like the shaft 112 shown in Fig. 11.

*Backing off mechanism.*—The cutter saddle or carriage is not only advanced for depth feed and withdrawn upon completion of the work piece, by the means thus described, but it is also slightly withdrawn after each cutting stroke to relieve the cutter of rubbing contact with the work on the non-cutting strokes, and returned prior to the next cutting stroke. At the same time the spindle is given a slight angular movement about its axis to avoid interference with the work consequent upon the rectilinear backing off movement of the carriage. The avoidance of interference in backing off is a difficult problem in connection with some forms of cutter, especially those of which the teeth have radial flanks extending within the base circle of their involute face curves. With such cutters, and also with those possibly otherwise formed but of such small diameter that an outer side of a tooth is overlapped by the stock of the work piece, that is, where the overlap crosses part of the path in which the cutter is moved bodily in backing off, interference occurs which may cause serious damage, and is harmful to some degree in any case. Solutions of this problem have been devised which satisfy certain conditions perfectly, and other conditions tolerably; but some conditions arise, where a relatively great overlap is found and the cutter is used in such a way that its teeth in operation cut on both sides at once, which are not satisfied by the relieving means heretofore used. By my present invention of combined displacement bodily and angular motion of the cutter, I am able to overcome the difficulties referred to.

Such translative movements are effected through the depth feed cam 105 which, for that purpose, is carried by a swinging frame 136, having bearings for the shaft 130, and supported by a pivot shaft 137 anchored in the stationary frame. The swing frame is moved to the right (with respect to Fig. 1) by a cam 138 on the main shaft 33 acting against an abutment roll 139 on the swing frame. Such swinging movement is permitted without derangement of the driving trains and shafting previously described, (parts of which, the shafts 48, 59, and 127 are also carried by the frame), by reason of the clutches 51 and 128. Each of said clutches comprises a member having external teeth on one shaft and an enveloping member having internal teeth on the respectively adjacent alined shaft. The teeth of these members mesh with minimum backlash and are so formed as to permit sliding movement and the slight change of angular relation incident to a displacement of the cutter of the order of a few thousandths of an inch, which is adequate for relief. Such angular and bodily displacement between complemental clutch members, and that between gear 46 and worm 33, do not cause any inaccuracy in the functioning of the machine. Thus the cam holds the cutter rigidly up to the work and positively returns it after backing off; the actual backing off movement being effected by the fluid pressure applying means lately described, which not only urges the saddle abutment against the depth feed cam, but urges the abutment roll 139 against the cam 138. The latter cam may be called for convenience of descriptive definition the translational relieving cam, because it controls that component of backing off movement which consists in translation bodily of the cutter. Being mounted on the main shaft, which gives a complete back and forth reciprocation to the cutter with each revolution, and having a single rise and a single descent located approximately 180° apart on its circumference, it effects the backing off and return movements in perfect timing at opposite ends respectively of the cutting stroke.

Figure 10:
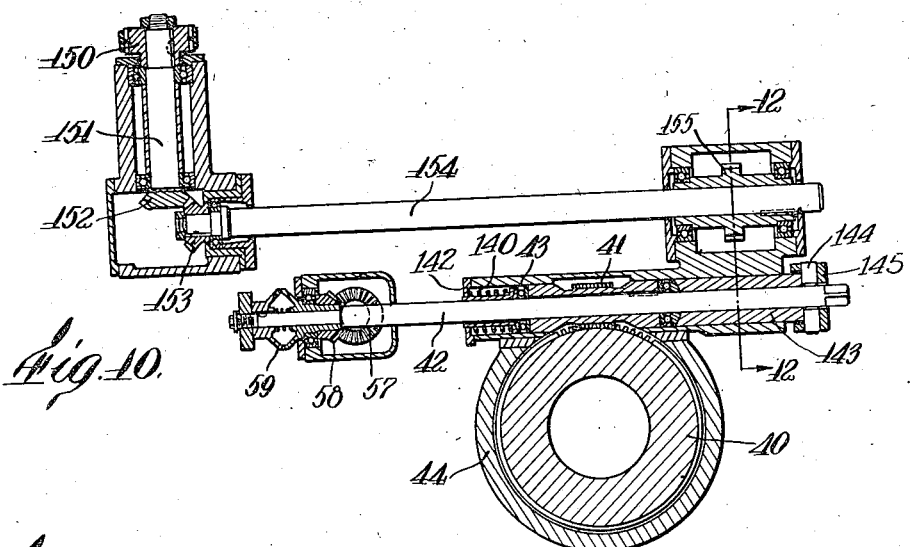
Fig. 10 is a horizontal section taken on line 10—10 of Fig. 2.

The oscillative or angular component of the relief movement is effected by giving the cutter index wheel 40 a slight angular movement effected by a spring 140 (Figs. 6 and 10) which moves the worm 41 endwise when permitted by a cam 141. Spring 140 is confined between one end of the worm and the adjacent end cap 142 of worm housing 43. The other end of the cam bears on a sleeve 143 slidingly fitted within said housing, the outer end of which bears against studs 144 carried by one arm of a lever 145, the other arm of which carries an abutment roll 146 in engagement with the cam 141. Lever 145 is pivoted on a pin 147 secured in lugs on the housing 43, and its end which carries the contact pins 144 is forked to straddle the worm driving shaft 42.

Figure 12:
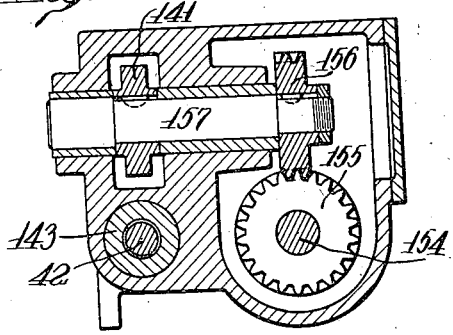
Fig. 12 is a detail sectional view, enlarged, taken on line 12—12 of Fig. 10.

Cam 141 is driven from the main shaft 33 by a sprocket 148 thereon (Fig. 2) link belt or chain 149, sprocket 150 on shaft 151, bevel gears 152 and 153, shaft 154 (Fig. 10), helical gears 155 and 156 (Fig. 12), and shaft 157 to which gear 156 and cam 141 are both made fast. Cam 141 may be called for convenient definition the oscillative relieving cam. Like the translational relieving cam it is positive in bringing the cutter back to cutting position, and holding it there. The sprocket and gear ratios of its driving train are so proportioned as to revolve it once with each revolution of the main shaft, and its descending and rising portions are so located and of such angular extent that they turn the cutter in the manner described while it pauses at each end of the stroke and is clear of the work. Where the cam is used only for the relieving purpose, its circumference between the rise and descent is composed of circular arcs; which is also the fact with respect to the translational relieving cam 138. Both cams are shown in the drawings with exaggeration of the differences between their high and low portions in order to make plain graphically that there are such differences. The actual differences are so small as to be imperceptible in drawings of the scale on which those herewith presented are made.

It will be understood that, inasmuch as the function of cam 141 is to turn the cutter index wheel by moving its worm endwise, other means than a cam, for instance electromagnetic, pneumatic or hydraulic, means may be used for the same purpose, wherefore the generic protection which I claim for this feature, and for the means employed to effect translational movement of the cutter also, is not to be construed as limited to a cam or cams only.

The oscillation producing cam 141, or its equivalent, is adapted to perform also the function of giving a progressive angular movement to the cutter about its axis in the course of its working stroke, thus causing its cutting edges to travel in helical paths of very small helix angle. For this purpose the cam may be made according to the principles illustrated in Fig. 6a. The modified cam, 141a, which may be assumed to rotate in the direction of the arrow placed upon it, has a gradual rise from a to b, which gives the cutter the desired angular motion while cutting; a drop from b to c for the relief motion, a gradual descent from c to d for retracing the helical path during the return stroke of the cutter, and a quick rise from d to a for replacing the cutter in position to commence another cut. The location of the rises and descents here mentioned are approximate and illustrative only; and of course reversals of the rises and descents, and of the direction of rotation, may be made within the scope of the invention.

The helical motion so caused may be used to supplement the effect of helical guides in the cutting of helical gears; i. e., to produce a helical angle in the work somewhat greater or less than that due to the spindle guides alone. Such motion I call incremental to that given by the guides, using the term "incremental" in a comprehensive sense to include a negative increment (or decrement) of rotation as well as a positive increment. It may also be used, in cutting either straight or helical gears, to compensate for an anticipated warping of the gear in subsequent heat treatment. The steel compositions of which hardened gears are made undergo distortion in the heat treatment to which the gears are subjected after being cut. With certain of these compositions the distortion is a measurable helical twist so definite in direction and amount as to be susceptible of compensation in advance by cutting the gear with an equal helical aberration in the opposite direction, which is canceled in the heat treatment. Cams suitably designed according to the principles explained to suit different conditions may be substituted for one another in the machine.

Figure 3:
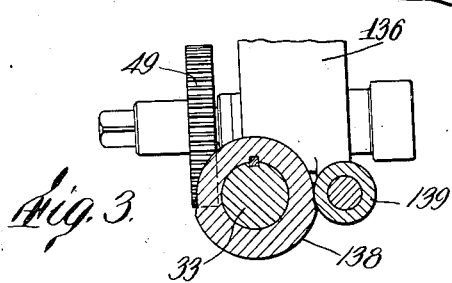
Fig. 3 is a detail section taken on line 3—3 of Fig. 2.

The translational relieving cam, or a modification thereof, is also adapted to serve a function in addition to its primary one of cooperating for relief of the cutter. This is to give the work and the teeth thereof a bowed or crowning formation from end to end. This is accomplished by so forming the cam that it alters the center distance of the cutter from the work piece progressively during the course of cutting travel, first in one direction and then in the other. Referring to Fig. 3a, a modified cam 138a is shown and is assumed to be rotating in the direction of the arrow. The arc from $f$ to $g$ passes the abutment roll while the cutter makes its cutting stroke. From $f$ to $h$ there is a gradual descent, which allows the cutter to withdraw during half of the stroke; and from $h$ to $g$ a rise which advances the cutter toward the work during the remainder of the stroke. From $g$ to $k$ is a descent which gives the translational component of backing off movement to the cutter; from $k$ to $l$ a dwell, and from $l$ to $f$ a rise which brings the cutter back to cutting position while it pauses at the end of the return stroke. The exact shape of the cam between the points $k$ and $l$ is unimportant, provided only all points in this arc are near enough the center of the cam to keep the cutter out of contact with the work throughout the entire return stroke.

By virtue of the parts $f$—$h$ and $h$—$g$ of the cam, the cutter produces an effect in the work which is diagrammatically shown, with exaggeration, in Fig. 3b, where 26 represents the cutter as in other figures, and 261 represents the work. The teeth are cut with their roots nearer to the axis of the gear at the ends $p$ and $r$ than elsewhere, which causes them to have greater width on the pitch circumference at intermediate points than at the ends. That is, they have a laterally crowned formation; and this is equally obtainable with helical gears as with spur gears. Such formation is of advantage in various situations. Not only does it take care to some degree of misalinement of the shafts of intermeshing gears in their supports, but it results in a sort of fadeaway from hard contact in the middle of the teeth toward the ends of the gears, making them more quiet in operation. The actual difference in dimensions need not be great to obtain these advantages, but ample latitude is afforded by the nature of the cam for making it as great as necessary, as well as for placing the greatest pitch width at any point desired on the length of the tooth and controlling the character of curvature between parts of greater and less pitch width; (the term "pitch width" is here used in the sense of the width or thickness of the tooth on the pitch cylinder).

*Adjustment of work spindle.*—The work spindle in each of its embodiments is long, rigid and under control for position and rigidity. It is adjustable as to height also. The spindle 21a of Fig. 4 is movable endwise through a bushing 159 mounted in the machine base and has, in a portion of its length, encircling rack teeth 160 meshing with a pinion 161 (Fig. 8) on a shaft 162 which carries a gear wheel 163. A shaft 164 (Fig. 5) supported in the frame with one end accessible at the front of the machine for engagement by a crank or wrench, carries a worm 165 in mesh with gear 163 so that the spindle may be raised or lowered at need. In order to support it against the thrust of the cutter, and relieve the adjusting mechanism of this duty, I have provided a supplementary bearing 166 removably supported on the machine base, surrounding the upper end of the spindle, and overlapped by a removable flange 167 on the spindle. By substituting different supplementary bearings of different heights, or combining with one bearing a number of different washers or filler rings, the spindle may be rigidly held at any height. Its sliding connection with the index wheel 90, previously described, permits such adjustment to any position within its full range. The capacity for such adjustment enables any unit of a cluster gear, for instance, to be put in position for cutting, and enables a work piece of any character and thickness to be properly located in the mid range of travel of the cutter. It eliminates any necessity of adjusting the height of the path in which the cutter travel occurs, although the length of this stroke may be varied by the screw 35 (Fig. 2), and permits the cutter travel to be comprised always within the same outermost limits.

The spindle 21, shown in Figs. 1 and 13, is adjustable by removal entirely, with its surrounding quill 168, and substitution of other spindles and quills, of which the height is greater or less. This spindle has a flange 167a bearing on the end of the quill (which here corresponds to the supplementary bearing 166), and it supports its index worm wheel 90a, which is clamped between a shoulder 169 and a nut 170. The lower end of the spindle protrudes below the index wheel and is confined by a stationary bearing 171.

The spindle 21b shown in Fig. 14 is adjustable endwise together with its index wheel 90b and the driving worms, etc. It is keyed and clamped to the index wheel, and is held at its opposite ends by bearings 172 and 173 in a sliding frame 174. Said sliding frame supports the driving worms, their shafts and all the driving train including the upright shaft 74a and the coupling sleeve 73a which has a splined sliding engagement with shaft 72. This is a departure from the arrangement shown in Fig. 4, where the index wheel and driving means are all supported by stationary bearings on the machine base. The sliding frame 174 has alined tubular extensions which contain the spindle bearings and fit guideways 175 and 176 in the stationary base, the latter guideway and lower frame extension having complemental guide elements 177 and 178 similar to the guide elements 91 and 92. Said lower extension carries external rack teeth 179 (Fig. 16) meshing with an adjusting pinion 180 on a shaft 181 which carries a gear wheel 182 turned by a worm 183 on an adjusting shaft 184. Rigid support is given to the sliding frame in any position by dividing the guideway 175 and making its outer half as a separate clamp 185 capable of being tightened by bolts 186 to grip the sliding frame tightly and securely.

It will be seen that in each embodiment illustrated, the spindle is firmly and accurately confined at both top and bottom, and that its length is so great and its opposite end bearings so far apart that its location and steadiness are controlled within the minutest limits of error.

The cutter spindle is guided in the course of its reciprocation so that, when used for cutting helical gears, it will be given a progressive angular movement in the direction and at the rate corresponding to the helical angle of the work to be cut; or may be guided without angular movement in cutting spur gears. The present invention includes an improvement in guiding means for this purpose, shown in detail in Figs. 19 and 20.

A sleeve 187 is fitted tightly and secured non-rotatably on the upper end of the cutter spindle by any suitable means. This sleeve has a plurality of external ribs 188 which may be straight, or helical with any desired degree of helical inclination less than the critical angle at which the helix would prevent sufficiently free endwise movement. A number of ribs substantially larger than two is preferred in order to distribute the torque well around the spindle. The faces of these ribs are preferably of involute curvature in cross section.

A complemental guide sleeve 189 is fitted and secured within the hub of the index worm wheel 40. The complemental ribs of this sleeve are formed of a lining of Babbitt metal, or equivalent material of sufficiently hard and durable substance and sufficiently low melting point, which is cast in place within sleeve 189 and around the rib sleeve 188 when the latter have first been assembled, one within the other, in relative positions as occupied in the machine. Sleeve 189 is preferably made of steel or other suitable structural material and must be enough larger than the ribbed sleeve to contain a liner of adequate thickness. It may be initially made with dovetail interior ribs and grooves 190 for better anchoring the lining. Complemental guides thus made are exact counterparts of one another and may be produced at much lower cost than those made by previous methods of manufacture.

I have shown also in this connection means for taking up looseness and backlash between the complemental guide ribs. Such means comprises a supplemental sleeve 191 of similar character to sleeve 189 and having a similar lining 192, which is placed in tandem with the sleeve 189 and secured thereto by bolts 193 and abutting flanges. The holes in the flange of sleeve 191 are wider than the shanks of the bolts whereby to permit angular movement, and the flange is also cut away to leave an open space into which protrudes a stud 194 from sleeve 189. The lugs 195 flanking such open space contain adjustable abutment screws 196 which bear oppositely on the stud and serve to give an exact regulation to the sleeve 191 and effect as close contact as desired between the complemental guideways.

What I claim and desire to secure by Letters Patent is:

1. In a gear shaping machine of the character described in which a cutter spindle is mounted reciprocatively and rotatably in a carriage, and the carriage is movable toward and from the work, means for backing off said carriage and means for simultaneously giving the cutter spindle an angular movement about its axis for relieving the cutter of contact with the work during the non-cutting strokes.

2. In a gear shaping machine having a cutter carriage, a cutter spindle reciprocatively and rotatably mounted in said carriage and a gear-like planing cutter carried by said spindle, a depth feed cam acting on said carriage for advancing the cutter with respect to the work, and means for moving said depth feed cam bodily back and forth whereby to cause backing off of the cutter from the work in non-cutting strokes and placement in operative position during cutting strokes.

3. In a gear shaping machine as set forth in claim 2, means for turning the cutter spindle oppositely during the said backing off and return movements respectively.

4. A gear shaping machine comprising a cutter carriage, a cutter spindle mounted rotatably and reciprocatively in said carriage, a gear-like cutter on said spindle, an index wheel on the spindle, a driving worm in mesh with said index wheel, and a depth feed cam engaged with said carriage for advancing the cutter to a given depth in the work and holding it there; in combination with a holder for said depth feed cam movable to shift the cam bodily in a direction such as to impart positive and negative increments respectively of its depth feeding motion to said carriage, control means for causing such movements to take place in time with the cutting and return strokes of the cutter, and control means for causing endwise shifting of said worm in opposite directions at respectively the same times.

5. A gear shaping machine comprising a reciprocative and rotatable cutter spindle, a gear-like cutter carried by said spindle, a work spindle, a means for rotating said spindles in harmony with one another to cause generative cutting of gear teeth in a work piece by the planing action of said cutter, combined with means for backing off the cutter with a combination of translative and rotative movements after its cutting strokes, and for returning it to cutting position by the combination of like movements in opposite directions after its return strokes.

6. A gear shaping machine as set forth in claim 5, in which the work spindle is supported in bearings at opposite ends and the means for rotating it includes an index wheel engaged with it between the so supported ends.

7. In a gear shaping machine having a rotatable and axially reciprocative cutter spindle, and a gear-like cutter carried by said spindle, a work spindle parallel to the cutter spindle, mounted with provision for adjustment lengthwise, and means for so adjusting said work spindle.

8. In a gear shaping machine as set forth in claim 7, additional means for holding the spindle in its adjusted positions rigidly against the thrust of the cutter upon the work.

9. In a gear shaping machine, a rotatable work spindle, an index worm wheel connected with said spindle and having axially slidable engagement therewith, a bearing in which said index wheel is held rotatably and means for adjusting the spindle end-wise with respect to said wheel.

10. In a gear shaping machine, a rotatable work spindle, an index worm wheel secured to said spindle; a worm meshing with said worm wheel, and means for adjusting said spindle, worm wheel and driving worm in the axial direction of the spindle.

11. In a gear shaping machine having a cutter spindle which is movable axially and rotatable about its axis, a cutter mounted on said spindle, a worm wheel surrounding the spindle in guided connection therewith for transmitting rotation to, while permitting endwise movement of, the spindle, means for reciprocating the spindle, a worm in mesh with said worm wheel for rotating it, and means for giving the worm a continuous endwise movement during the cutting stroke of the spindle for imparting an incremental rotation thereto throughout the entire course of said cutting stroke.

12. In a gear shaping machine having a cutter carriage, a cutter spindle reciprocatably and rotatably mounted in said carriage, a gear-like planing cutter carried by said spindle, and depth feeding means for giving a progressive depth feed movement to the carriage, a cam additional to said depth feeding mechanism for moving said carriage back and forth to relieve the cutter from the work in non-cutting strokes, said cam being designed to retract and advance the carriage in the course of the cutting strokes, whereby to shape teeth with a crowning formation in the work.

13. A gear generating machine comprising a rotatable cutter spindle, a gear-like planing cutter mounted on said spindle, a work spindle, means for rotating said spindles at relative angular speeds and in relative directions corresponding to those of a gear, represented by the cutter, and a conjugate gear, represented by the work piece, rotating in mesh, means for reciprocating one of the spindles to effect shaping of the work piece by the cutter, a carriage holding one of said spindles and being movable back and forth to effect a relative approach and recession between the teeth of the cutter and the teeth being cut in the work, means for giving such a receding movement to the carriage after each cutting stroke of the reciprocating spindle and an approaching movement after each return stroke, and means for giving an angular movement about its axis to one of the spindles at the same time; said movements being sufficient in directions and extent to avoid contact between the cutter and work during non-cutting strokes and restore the cutting relationship prior to the cutting strokes.

14. In a gear shaping machine, a rotatable work spindle, an index worm wheel secured to said spindle, a base, a frame having bearings in which said spindle is rotatable and being mounted in said base with capacity for movement axially of the spindle, a worm journaled in said frame meshing with said worm wheel for rotating the latter, and means for securing said frame in different positions lengthwise of its range of movement.

15. A gear shaping machine comprising a supporting structure, a rotatable and endwise reciprocatable cutter spindle mounted on said supporting structure, a work spindle parallel with said cutter spindle, a frame in which said work spindle is mounted rotatably, said frame being mounted in the supporting structure with capacity for adjustment lengthwise of the work spindle, means for securing said frame rigidly in different adjusted positions, rotation transmitting means for said spindle coupled thereto and mounted in said frame, and correlated driving mechanism for said rotation transmitting means and the cutter spindle organized to cause rotation of the two spindles in harmony with one another and including a coupling having parts relatively movable in the direction of such movement of the frame.

16. In a gear shaping machine, a supporting structure having separate, axially alined guideways, a frame fitted to said guideways for movement therein, a work spindle rotatably mounted in said frame with its axis extending in the direction of movement of the frame, a worm wheel secured to the spindle at a location intermediate said guideways and intermediate the bearings for the spindle in the frame, a worm supported by said frame meshing with said worm wheel, driving mechanism mounted on the supporting structure for rotating said worm and including a coupling organized to transmit rotation to the worm while permitting shifting thereof with the frame, and means for securing the frame against displacement by axial thrust exerted against the spindle.

17. In a gear shaping machine, a supporting structure, a work spindle rotatably supported in said structure and being shiftable in the axial direction, a supplementary bearing detachably secured to the supporting structure surrounding a part of the spindle which protrudes from said supporting structure, and a flange on the spindle overlapping the end of said supplementary bearing.

18. In a gear shaping machine, a supporting structure having alined bearings, a work spindle rotatably mounted in one of said bearings, a supplementary bearing secured to the last specified bearing surrounding a part of the spindle, the spindle having an end thrust flange bearing on the end of the supplementary bearing, a worm wheel rotatably mounted in the other bearing in axial alinement with the spindle, and means for rotating said worm wheel; the spindle having an axially slidable splined engagement with the worm wheel to permit adjustment thereof endwise with substitution of longer or shorter supplementary bearings.

19. A gear shaping machine comprising co-operating rotatable cutter and work spindles, said cutter spindle being also reciprocable for actuating a gear shaper cutter, means for rotating said spindles in harmony with one another, the means for thus rotating the work spindle comprising a worm wheel and two worms meshing therewith at different sides of the wheel, means for rotating said worms in harmony with one another to impart rotation to the worm, and means for causing one of said worms to exert tangential force in opposition to the tangential force exerted by the other worm, whereby a resultant force is applied to the work spindle in a definite direction, taking up backlash between the spindle and its bearing.

20. In a gear shaping machine, a work spindle, an index worm wheel connected to the spindle for rotating it, a driving worm meshing with said wheel at one side of its axis, a second worm meshing with said worm wheel at a different side of its axis, connected driving means for rotating said worms in harmony with one another, one of the worms being movable endwise relatively to the other and to the worm wheel, springs acting oppositely to one another on opposite ends of said worm, and selective means for relieving the worm of the pressure of either spring while simultaneously exposing it to the pressure of the other spring.

21. In a gear shaping machine, cutter and work spindles, means for reciprocating the cutter spindle to cut gear teeth in a work piece carried by the work spindle, means for rotating said spindles in harmony with one another, including a worm wheel on the work spindle and a driving worm meshing with said worm wheel, and means for taking up backlash between the work spindle and its bearing comprising a second worm meshing with said worm wheel at a different side thereof from the first named worm, driven in harmony with said first worm, and spring actuated to exert a component of force tangentially upon the wheel; the components of such force exerted by the two worms producing a resultant pressure on the wheel toward one side of its bearing.

22. In a gear shaping machine, a rotatable and axially reciprocatable cutter spindle, means for reciprocating the spindle, a worm wheel coupled with the spindle for rotating it, a driving worm in mesh with said worm wheel, a driving shaft for the worm on which the latter is splined for endwise movement, a cam organized to impart endwise movement to said worm, and means for rotating the cam in time with the reciprocating movements of the spindle, the cam having an active portion organized to impart continuous endwise movement to the worm throughout the cutting stroke of the spindle.

23. In a gear shaping machine, a supporting structure, a carriage mounted movably on said supporting structure, cutter and work spindles, one of which is mounted rotatably in the supporting structure and the other in said carriage, means for rotating said spindles in harmony, means for reciprocating one of said spindles in the direction of its axis, a cam acting on said carriage to move it in one direction, and means for exerting a yielding pressure on the carriage tending to move it in the other direction and to maintain it in contact with the cam comprising rack teeth on the carriage, a pinion rotatably mounted on the supporting structure in mesh with said rack, a cylinder, a piston operating in said cylinder, means for supplying fluid pressure to said cylinder, and transmission connection between said piston and pinion organized to rotate said pinion, when the piston is propelled by fluid pressure, in the direction which causes movement of the carriage toward the cam.

24. In a gear cutting machine, a supporting structure, a carriage movable on said structure, a work spindle and a cutter spindle, one of which is mounted rotatably in the supporting structure and the other in the carriage, and both being transverse to the path of movement of the carriage, whereby the displacements of the latter change the distance between the spindle axes, means for reciprocating one of said spindles endwise to effect cutting of a work piece on the work spindle by means of a cutter on the cutter spindle, means for progressively shifting the carriage to shorten the center distance between the spindles, and a cam additional to said shifting means for moving the carriage back and forth constructed and driven in time with the reciprocations of said reciprocative spindle to move the carriage first in one direction and then in the opposite direction during the course of each such reciprocation.

25. In a gear cutting machine, a supporting structure, a carriage movable on said structure, a work spindle and a cutter spindle, one of which is mounted rotatably in the supporting structure and the other in the carriage, and both being transverse to the path of movement of the carriage, whereby the displacements of the latter change the distance between the spindle axes, means for reciprocating one of said spindles endwise to effect cutting of a work piece on the work spindle by means of a cutter on the cutter spindle, a cam organized to advance the carriage progressively to effect a depth feed between the cutter and work and having a dwell organized to control the carriage throughout the cutting cycle after completion of such depth feed, a holder for said cam movably mounted on the supporting structure, and a second cam mounted on the supporting structure and arranged to actuate said cam holder; the second cam being driven in time with the reciprocations of said reciprocative spindle and being constructed to effect shifting of said cam holder and carriage first in one direction and then in the opposite direction in the course of each cutting stroke of the reciprocative spindle.

26. In a gear shaping machine having a cutter carriage, a cutter spindle reciprocatably and rotatably mounted in said carriage and a gear-like planing cutter carried by said spindle, a depth feed cam acting on said carriage for advancing the cutter with respect to the work, and means for moving said depth feed cam bodily back and forth in the course of each cutting reciprocation of the spindle, whereby to shape teeth in the work with variable thickness between their ends.

27. In a gear shaping machine of the type in which gear tooth curves are generated in the work by relative cutting and return traverses between a gear like planing cutter and the work piece, with simultaneous relative rolling motion like that of gears corresponding respectively to the cutter and work piece running in mesh, mechanism for moving one of said elements away from the other after each cutting traverse and back after each non-cutting traverse, and mechanism for simultaneously turning one element incrementally about its own axis, first in one direction and then in the opposite direction, sufficiently to avoid contact between overlapping parts of said elements.

28. In a gear shaping machine having cutter and work spindles rotatably mounted parallel to one another and means for reciprocating one of them axially and rotating both in such manner as to generate gear tooth curves in a work piece by a gear like planing cutter secured to the cutter spindle; means for avoiding rubbing contact between the cutter and work piece during non-cutting strokes, comprising mechanism for moving one of said spindles bodily away from the other in their common plane, after each cutting stroke, and correlated mechanism for simultaneously turning one of them about its axis sufficiently to clear the cutter teeth from interference with overlapping parts of the work piece.

29. In a gear shaping machine, the combination of cutter and work spindles rotatably mounted parallel to one another, means for reciprocating one of them axially, means for rotating both in such manner as to generate gear tooth curves in a work piece by a gear like planing cutter secured to the cutter spindle, and means for avoiding rubbing contact between the cutter and work piece during non-cutting strokes, comprising mechanism for moving the cutter spindle bodily away from the work spindle in the plane of the spindle, and simultaneously giving the cutter spindle an increment of angular movement about its own axis.

30. In a gear shaping machine of the character described, a work spindle adapted to carry a work piece at one end, separated bearings in which said work spindle is rotatably mounted and from one of which the work-carrying end of the spindle protrudes, an index wheel engaged with said spindle intermediate its bearings, and means for so shifting the work spindle as to alter the position of its work holding part lengthwise of the travel of the cutter.

31. In a gear cutting machine, a supporting structure, a carriage movable on said structure, a work spindle and a cutter spindle, one of which is mounted rotatably in the supporting structure and the other is so mounted in the carriage, and both extend transversely to the path of movement of the carriage, means for reciprocating one of said spindles endwise to effect cutting of a work piece on the work spindle by means of a cutter on the cutter spindle, means for propelling the carriage in the direction to lessen the distance between the two spindles whereby to locate the cutter and work relatively to one another for cutting to a prescribed depth, and means for shifting said carriage propelling means during the cutting traverse between the cutter and work so as to alter the center distance between the spindles during the course of such traverse.

32. In a gear shaping machine having a cutter carriage, a cutter spindle reciprocatably and rotatably mounted in said carriage, and a gear like planing cutter carried by said spindle, carriage propelling means organized to shift the carriage transversely of the cutter spindle in a path leading toward the work, and means for shifting said carriage propelling means back and forth in the course of the cutting traverses of the spindle, whereby to shape teeth in the work with variable thickness between their ends.

33. The combination in a gear shaping machine, of a gear like planing cutter, a work holder, means for relatively reciprocating said cutter and work holder in a path causing the cutter to plane tooth spaces in a work piece carried by the work holder, means for simultaneously rotating the cutter and work holder to cause rolling movement of the cutter and work piece like that of gears running in mesh, and mechanism for effecting between the cutter and work piece a compound movement of translative withdrawal and rotation after each cutting traverse sufficient to avoid rubbing contact during the following non-cutting traverse.

34. The combination, in a gear shaping machine, of a gear like planing cutter, means for producing relative cutting and return traverses between said cutter and the work piece, means for simultaneously effecting a relative rolling motion like that of gears corresponding respectively to the cutter and work piece running in mesh, and mechanism for effecting between the cutter and work piece relative movements of withdrawal, compounded of translation and rotation, after each cutting traverse, and opposite compound movements after each non-cutting traverse.

35. In a gear shaping machine, a gear like planing cutter, a work holder, means for causing relative cutting and return traverses between said cutter and work holder, means for rotating the cutter and work holder about parallel axes during the continuance of such traverses so as to produce a relative movement between the cutter and a work piece similar to that of gears running in mesh, and mechanism for moving the cutter translatively in the plane of said axes and rotatively about its own axis, away from the work piece after each cutting traverse, and back after each non-cutting traverse.

36. In a gear shaping machine, a reciprocatable and rotatable spindle, a rotation transmitting sleeve surrounding the spindle and through which the latter is movable endwise, complemental helical guiding surfaces on the spindle and sleeve respectively for imparting a twisting motion to the spindle as it reciprocates, and a second sleeve having guiding surfaces similar to those of the first sleeve in engagement with the complemental guiding surfaces of the spindle; said second sleeve being adjustable angularly about the spindle axis relatively to the first sleeve for taking up backlash and wear between said complemental surfaces.

37. The combination of a reciprocable and rotatable spindle and two sleeves surrounding said spindle with provision for relative axial movement between the spindle and said sleeves, means for imparting endwise reciprocating movement to the spindle, a plurality of complemental helicoidal guiding members on the spindle and sleeves respectively, so inclined as to rotate the spindle in the course of its lengthwise movements, and means for securing said sleeves to one another with provision for relative adjustment between them angularly around the axis of the spindle whereby to take up backlash between the complemental helicoidal surfaces.

38. In a gear shaping machine, the combination of a rotatable and reciprocable spindle, with sleeves in tandem arrangement surrounding the spindle, the spindle having an external helical rib with helicoidal guiding surfaces on its opposite sides, and one of the sleeves having a helicoidal surface complemental to the surface at one side of said guide while the other sleeve has a helicoidal surface complemental to the surface at the opposite side of the guide, said helicoidal surfaces being so inclined as to rotate the spindle in the course of its endwise movements, means for securing the sleeves to one another in positions of relative adjustment angularly about the axis of the spindle for taking up looseness between the said guiding surfaces, and means for imparting rotation to the sleeves.

39. In a gear shaping machine, a rotatable and endwise reciprocative spindle having a plurality of external guides with contact faces on their respectively opposite sides, a sleeve surrounding said spindle and having abutments in engagement with the faces at one side of the respective guides, a second sleeve having abutments in engagement with the relatively opposite sides of the respective guides, means for reciprocating said spindle by imparting thrust endwise thereto, means for rotating one of the sleeves, and means for adjusting one of said sleeves relatively to the other angularly around the axis of the spindle.

40. In a gear shaping machine, the combination of internal and external cylindrical members, one of which is reciprocatable relatively to the other in sliding engagement therewith, and both of which are rotatable, means for applying endwise reciprocating thrust to the reciprocatable one of said members, means for imparting rotation to one of said members, and guiding means for transmitting rotation from said rotatably driven member to the other member and for causing the latter to oscillate in the course of its reciprocative movements; said guiding means comprising complemental ribs and grooves on the respective members, one of said members being composed of separate parts in tandem arrangement, one of which parts is angularly adjustable about their common axis relatively to the other for taking up backlash between the abutting faces of the said ribs and grooves.

41. In a gear shaping machine, cutter and work spindles, one of which is reciprocatable and both of which are rotatable about their respective axes, means for rotating said spindles in generative harmony including a worm wheel surrounding the reciprocative spindle, with which the latter has longitudinally slidable engagement, and a worm meshing with the worm wheel, and correlated means for reciprocating said spindle and simultaneously displacing said worm endwise so as to advance and retract the spindle with a twisting motion.

42. In a gear shaping machine, cutter and work spindles, one of which is reciprocatable and both of which are rotatable about their respective axes, means for rotating said spindles in generative harmony including a worm wheel surrounding the reciprocative spindle, with which the latter has longitudinally slidable engagement, and a worm meshing with the worm wheel, means for reciprocating said spindle, and a cam organized to effect endwise movement of said worm progressively in one direction during the endwise movement of the spindle in one direction.

43. In a gear shaping machine, cutter and work spindles, one of which is reciprocatable and both of which are rotatable about their respective axes, means for rotating said spindles in generative harmony including a worm wheel surrounding the reciprocative spindle, with which the latter has longitudinally slidable engagement, and a worm meshing with the worm wheel, means for moving the spindle back and forth endwise, and mechanism correlated with said means to shift the worm endwise in one direction while the spindle makes an advancing stroke, and in the opposite direction while the spindle returns.

44. In a gear shaping machine, the combination with a reciprocatable and rotatable spindle, means for reciprocating it, and a rotation-transmitting gear element surrounding the spindle and within which the spindle is concentrically located and relatively movable endwise, of complemental helical guiding means respectively on the spindle and secured within said gear element, one of the parts of said guiding means being a rib having opposite helicoidal surfaces, and the cooperating part of said guiding means being helicoidal faces at opposite sides of a space into which said rib protrudes, that portion of the guiding means which is secured within the gear element being divided into relatively movable parts adjustable angularly, one with respect to the other, around the axis of the spindle, and means for thus adjusting the adjustable part in such manner as to compensate for wear and maintain effective contact between the opposite sides of the rib and the coacting helicoidal surfaces.

45. In a gear shaping machine the combination with a reciprocatable and rotatable spindle having a helical rib with helicoidal guiding surfaces on its opposite sides, and means for reciprocating said spindle, of a sleeve surrounding the spindle, through which the spindle is movable endwise, said sleeve having helicoidal surfaces complemental respectively to the opposite sides of said rib, and means for effecting adjustment, around the axis of the spindle, of said helicoidal surfaces whereby to take up backlash and looseness between said surfaces and the rib.

EDWARD W. MILLER.